United States Patent [19]
Fitzpatrick et al.

[11] Patent Number: 5,874,943
[45] Date of Patent: Feb. 23, 1999

[54] FEEDBACK OF OBJECT SIZE DURING DIRECT MANIPULATION

[75] Inventors: Gregory P. Fitzpatrick, Ft. Worth; Thomas R. Haynes, Euless, both of Tex.

[73] Assignee: International Business Machines Corporation, Armonk, N.Y.

[21] Appl. No.: 36,591

[22] Filed: Mar. 24, 1993

[51] Int. Cl.[6] .................................................. G09G 5/08
[52] U.S. Cl. ........................ 345/159; 345/145; 345/163
[58] Field of Search .................................. 340/706, 710, 340/709; 395/144, 145, 146, 118, 159; 178/18; 345/145, 159, 157, 163

[56] References Cited

U.S. PATENT DOCUMENTS 4,868,549  9/1989  Affinito et al. ........................ 340/710
5,195,179  3/1993  Tokunaga ............................... 345/159

*Primary Examiner*—Amare Mengistu
*Attorney, Agent, or Firm*—Norman L. Gundel

[57] ABSTRACT

A method and apparatus are provided for feedback of object size during direct manipulation. In one embodiment, the invention determines whether the file size of an object being directly manipulated exceeds a threshold and, if the file size exceeds the threshold, varies the mouse tracking speed. The mouse tracking speed is preferably reduced if the file size exceeds an upper threshold and increased if the file size exceeds (falls below) a lower threshold. The mouse tracking speed is preferably restored to its unvaried value upon the conclusion of the direct manipulation.

20 Claims, 3 Drawing Sheets

FEEDBACK OF OBJECT SIZE DURING DIRECT MANIPULATION

BACKGROUND OF THE INVENTION

1. Field of the Invention

The present invention relates to data processing systems and in particular to data processing systems that provide graphical user interfaces that permit direct manipulation operations.

2. Description of the Related Art

A data processing system may be provided with a graphical user interface that permits direct manipulation of displayed objects with an on-screen graphical selector, called a pointer, of a mouse, trackball or other pointing device. A graphical user interface may display objects, such as system resources and data files, as icons on a display device such as a display monitor. A system resource may be a device such as a printer which may be represented on the graphical user interface as a printer icon. A data object may be a text file which may be represented in the graphical user interface as a file icon. A person, called a user, who is operating the data processing system may perform various operations by using the pointer to "drag" an object about on the display device. Thus, a user may, through direct manipulation using a pointing device, drag the data object's file icon and drop it upon the display printer device's printer icon, thereby causing the display printer to print the data file.

The displayed appearance of an icon, including both the graphical component and any text accompanying it, may be user selectable and user editable. The displayed appearance of an icon may vary automatically in accordance with the state of the object represented by the icon. Thus, a mailbox icon may change appearance to indicate the presence of new mail, a trash can icon may bulge to show that it contains deleted objects that may be recovered, or a printer icon may change to indicate that the printer has run out of paper.

The pointer is displayed on the desktop. The user may manipulate a pointing device such as a mouse or trackball to move the pointer about on the desktop. The user may specify the sensitivity or "mouse tracking speed" of the pointer to movement of the pointing device by adjusting the amount of screen movement of the pointer for a given movement of the pointing device. Similarly, a user may enable or disable pointer acceleration and adjust the amount of pointer acceleration. Pointer acceleration causes greater movement of the displayed pointer for faster movement of the pointing device over the same distance.

During direct manipulation operations, an icon may be dragged about the desktop with a pointer and dropped on eligible target objects. The displayed appearance of the pointer may change to a "do not" pointer when a target object is not a valid target for the direct manipulation operation.

Some direct manipulation enabled operations, such as print, copy or move, require a greater dedication of system resources for large, storage intensive objects having a large file size, which may be measured in bytes. Printing a large file requires more resources than printing a small file. A user selecting a file of unknown size for printing may prefer not to print the selected file if he learns that the file is too large. Alternatively, the user may prefer to print the selected file on a different printer. Similarly, a user selecting a file of unknown size for printing may realize that he has selected the wrong file if he learns that it has a file size of zero, signifying that the selected file is empty. However, direct manipulation provides no user feedback of file size.

SUMMARY OF THE INVENTION

In accordance with the invention, a method and apparatus are provided for feedback of object size during direct manipulation. In one embodiment, the invention determines whether the file size of an object being directly manipulated exceeds a threshold and, if the file size exceeds the threshold, varies the mouse tracking speed. The mouse tracking speed is preferably reduced if the file size exceeds an upper threshold and increased if the file size exceeds (falls below) a lower threshold. The mouse tracking speed is preferably restored to its unvaried value upon the conclusion of the direct manipulation.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

While the invention will be described in connection with a preferred embodiment, it will be understood that the description is not intended to limit the invention to that embodiment. On the contrary, the invention is intended to cover all alternatives, modifications and equivalents as may be included within the spirit and scope of the invention as described by the appended claims.

DETAILED DESCRIPTION OF THE PREFERRED EMBODIMENT

Figure 1:
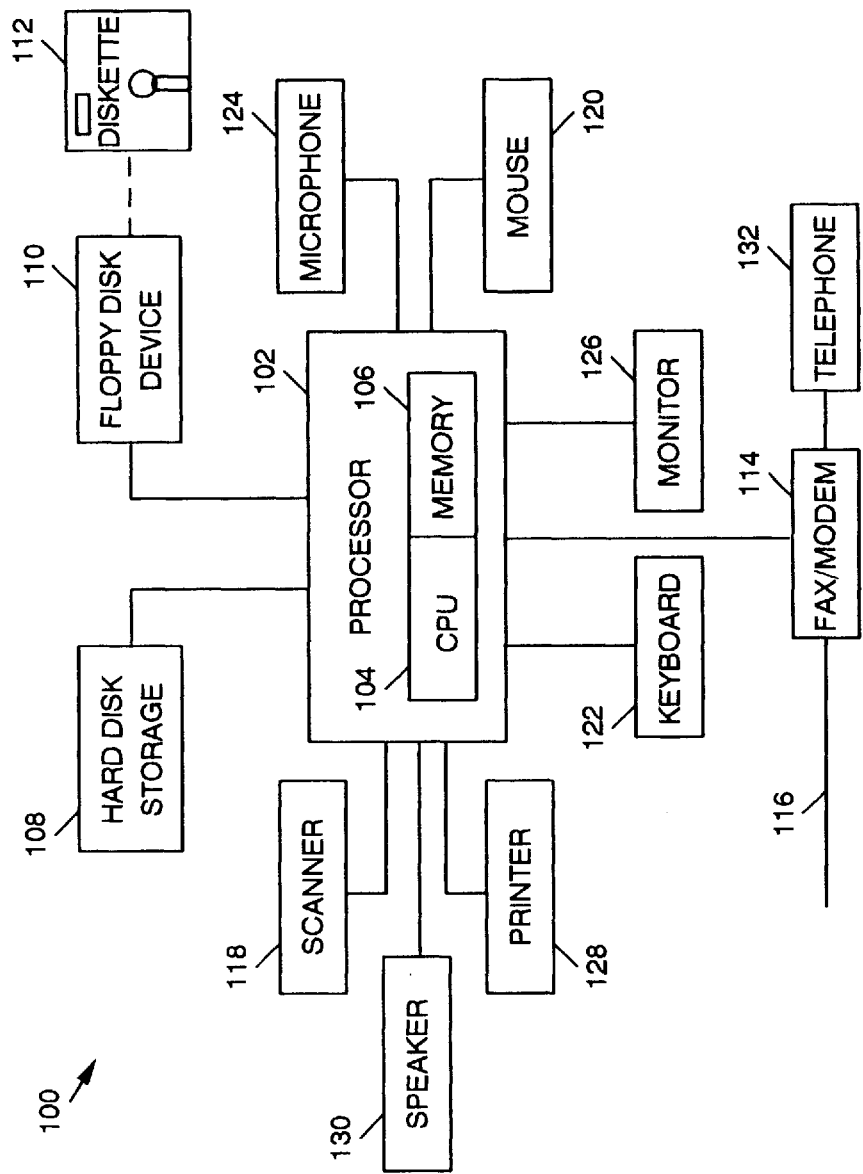
FIG. 1 is a block diagram of an apparatus used in performing the method of a preferred embodiment of the present invention and forming a part of the apparatus of a preferred embodiment of the present invention.

With reference now to the Figures, and in particular with reference to FIG. 1, there is shown, in block diagram form, an apparatus according to the present invention. The apparatus includes a data processing system 100. Data processing system 100 may be a preferred IBM PS/2 (trademarks of IBM Corp.) computer configured as described herein. The data processing system 100 includes a processor 102, which includes a central processing unit (CPU) 104 and memory 106. Additional memory, such as a hard disk file storage 108 and a floppy disk device 110 may be connected to the processor 102. Floppy disk device 110 may write to or read from a removable diskette 112 which may have computer program code recorded thereon that implements portions of the present invention in the data processing system 100. Inputs may also be received from a fax/modem 114, which is connected to a telephone line 116, and from a scanner 118. The data processing system 100 also includes user interface hardware, such as a pointing device such as mouse 120, a keyboard 122 and a microphone 124, for allowing user input to the processor 102. The data processing system 100 also includes a visual display device, such as a monochrome or color display monitor 126 and a monochrome or color display printer 128, for rendering visual information. The data processing system may also include an audio display device, such as a speaker 130 for rendering audio information. A telephone 132 may be connected to the telephone line 116 through the fax/modem 114. The data processing system 100 includes an operating system such as the preferred IBM OS/2 and a graphical user interface such as the preferred OS/2 Presentation Manager and the preferred IBM Workplace Shell (trademarks of IBM Corp.).

Figure 2:
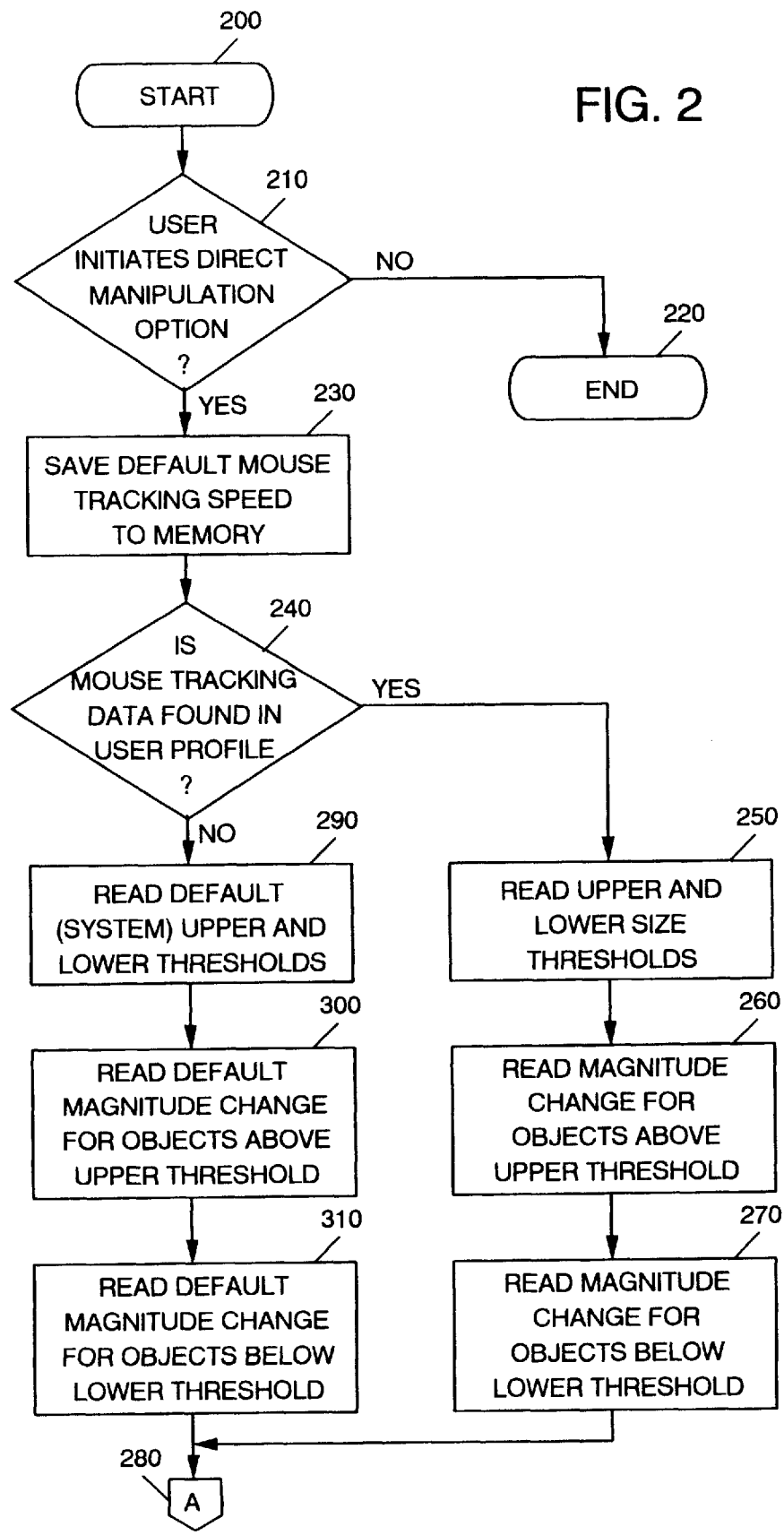
FIGS. 2 and 3 are a high level logic flowchart illustrating the method of a preferred embodiment of the process for feedback of object size during direct manipulation.
Figure 3:
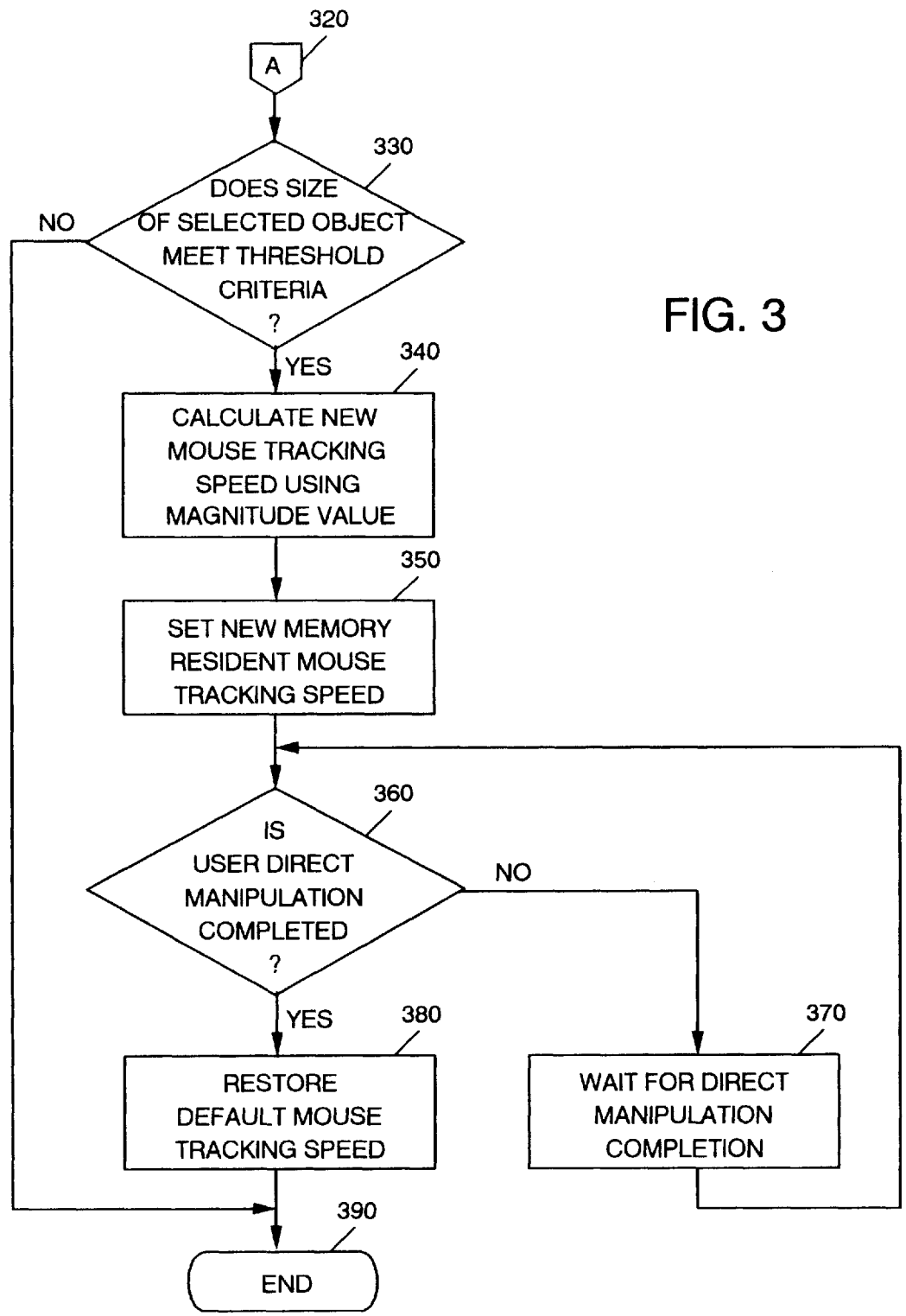

With reference now to FIGS. 2 and 3, there is depicted a high level logic flowchart which illustrates the method of a preferred embodiment of the present invention for feedback of object size during direct manipulation. The invention conveys the file size of the object to the user by varying the mouse sensitivity during a drag operation. The file size of the object may be the size of the file measured in bytes or in any other manner conventional to the data processing system. Mouse sensitivity is reduced when a large file object is dragged and increased when a small file object is dragged. Reduced mouse tracking speed reduces the on-screen movement of the on-screen pointer in response to a given movement of the pointing device. Thus, dragging a large file object across the display screen requires more physical movement of the physical pointing device than the same on-screen drag of a small file object, giving the user an illusion of greater mass when dragging the large object.

In the preferred embodiment of the process disclosed herein, mouse acceleration is not enabled and the normal or default constant mouse tracking speed is varied by reducing it to a slower constant mouse tracking speed if the size of the file object being manipulated exceeds an upper threshold. Similarly, the normal or default constant mouse tracking speed is varied by increasing it to a higher constant tracking speed if the size of the file object being manipulated exceeds (falls below) a lower threshold. In either event, the mouse tracking speed returns to its unvaried normal or default value upon termination of the direct manipulation operation.

Turning now to FIG. 2, the process commences at block 200 with a graphical user interface active on the data processing system 100. The process then proceeds to block 210 and determines whether the user has initiated a direct manipulation operation. A direct manipulation operation may be initiated in a known manner such as by clicking the pointer on an object displayed by the graphical user interface. If no, the process proceeds to block 220 and terminates. If yes, the process proceeds to block 230.

In block 230, the process saves the existing or default mouse tracking speed to memory. The process then proceeds to block 240 for a determination of whether the user has previously saved customized mouse tracking data to the user's profile. If yes, the process proceeds to block 250 and reads the user defined upper and lower thresholds. The process then proceeds to block 260 and reads the user defined magnitude change in mouse tracking speed for objects whose file size exceeds the upper threshold. The process then proceeds to block 270 and reads the user defined magnitude change in mouse tracking speed for objects whose file size exceeds (falls below) the lower threshold. The process then proceeds to off page connector 280 and thence to FIG. 3.

Returning to block 240, if no user defined mouse tracking data is found in the user profile, the process proceeds to block 290 and reads the default upper and lower thresholds. Preferably, the default lower threshold will distinguish only empty files. The process then proceeds to block 300 and reads the default magnitude change in mouse tracking speed for objects whose file size exceeds the upper threshold. The process then proceeds to block 310 and reads the default magnitude change in mouse tracking speed for objects whose file size exceeds (falls below) the lower threshold. The process then proceeds to off page connector 280 and thence to FIG. 3.

Turning now to FIG. 3, the process continues at connector 320 and proceeds to block 330 for a determination of whether the size of the object being manipulated meets the threshold criteria—that is, whether the size exceeds the upper threshold or exceeds (falls below) the lower threshold. If no, the process proceeds to block 390 and terminates without modifying the mouse tracking speed. If yes, the process proceeds to block 340.

In block 340, the process calculates the new mouse tracking speed. In the preferred embodiment, the calculation is straightforward—if the object size exceeds the upper threshold, the new mouse tracking speed is equal to the magnitude change read in block 260 or 300 above, and if the object size exceeds (falls below) the lower threshold, the new mouse tracking speed is equal to the magnitude change read in block 270 or 310 above. However, the invention also contemplates new mouse tracking speeds that may vary in accordance with the actual file size of the object, either linearly or in some other relationship. The invention also contemplates a new mouse tracking speed that may also vary as a function of some other relationship, such as the distance from the initial displayed location of the object within the graphical user interface or changes in the direction of movement of the object being dragged. Such a function may simulate the overcoming of the inertia of a large, heavy object at rest or the momentum of an object already in motion.

From block 340, the process proceeds to block 350 and varies the mouse tracking speed by setting the mouse tracking speed of the data processing system 100 to the new mouse tracking speed calculated in block 340. Direct manipulation may commence. The process then proceeds to block 360 for a determination of whether the direct manipulation, whose initiation was detected in block 210, has been completed. If no, the process proceeds to block 370 and waits for the completion of the direct manipulation operation. The process then returns from block 370 to block 360.

When block 360 determines that the direct manipulation operation has been completed, the process proceeds to block 380 and restores the unvaried normal or default mouse tracking speed. The process then proceeds to block 390 and terminates.

Upon reference to the foregoing, it will be appreciated that the applicants have provided a novel and useful method and apparatus for feedback of object size during direct manipulation. While the invention has been particularly shown and described with reference to a preferred embodiment and process, it will be understood that various changes in form and detail may be made therein without departing from the spirit and scope of the invention.

What is claimed is:

1. A method, performed in a data processing system, for providing feedback of the file size of an object during direct manipulation of the object with a pointing device, said pointing device having a default mouse tracking speed, the method comprising the computer implemented steps of:

determining whether the file size of the object being directly manipulated exceeds a threshold; and if the file size exceeds the threshold, varying the mouse tracking speed.

2. The method of claim 1, wherein the computer implemented step of varying the mouse tracking speed includes the computer implemented step of reducing the mouse tracking speed.

3. The method of claim 1, wherein the computer implemented step of varying the mouse tracking speed includes the computer implemented step of increasing the mouse tracking speed.

4. The method of claim 1, wherein the mouse tracking speed is varied until the completion of the direct manipulation of the object.

5. The method of claim 1, further comprising the computer implemented step of establishing the threshold.

6. The method of claim 1, further comprising the computer implemented step of restoring the mouse tracking speed to the default mouse tracking speed upon completion of the direct manipulation of the object.

7. The method of claim 1, further comprising the computer implemented step of establishing an upper threshold and a lower threshold.

8. The method of claim 7, wherein the computer implemented step of varying the mouse tracking speed includes the computer implemented step of increasing the mouse tracking speed if the file size exceeds the lower threshold and further includes the computer implemented step of decreasing the mouse tracking speed if the file size exceeds the upper threshold.

9. A data processing system for providing feedback of the file size of an object during direct manipulation of the object with a pointing device, said pointing device having a default mouse tracking speed, the data processing system comprising:

means for determining whether the file size of the object being directly manipulated exceeds a threshold; and means for varying the mouse tracking speed if the file size exceeds the threshold.

10. The data processing system of claim 9, wherein the means for varying the mouse tracking speed includes means for reducing the mouse tracking speed.

11. The data processing system of claim 9, wherein the means for varying the mouse tracking speed includes means for increasing the mouse tracking speed.

12. The data processing system of claim 9, wherein the mouse tracking speed is varied until the completion of the direct manipulation of the object.

13. The data processing system of claim 9, further comprising means for establishing a threshold.

14. The data processing system of claim 9, further comprising means for restoring the mouse tracking speed to its unvaried value upon completion of the direct manipulation of the object.

15. The data processing system of claim 9, further comprising means for establishing an upper threshold and a lower threshold.

16. The data processing system of claim 15, wherein the means for varying the mouse tracking speed includes means for increasing the mouse tracking speed if the file size exceeds the lower threshold and further includes means for decreasing the mouse tracking speed if the file size exceeds the upper threshold.

17. A method, performed in a data processing system, for providing feedback of the file size of an object during direct manipulation of the object with a pointing device, said pointing device having a default mouse tracking speed, the method comprising the computer implemented step of varying the mouse tracking speed as a function of the file size of the object during direct manipulation of the object with the pointing device.

18. The method of claim 17, wherein the computer implemented step of varying the mouse tracking speed includes the computer implemented step of reducing the mouse tracking speed.

19. The method of claim 17, wherein the mouse tracking speed is varied until the completion of the direct manipulation of the object.

20. The method of claim 17, further comprising the computer implemented step of restoring the mouse tracking speed to the default mouse tracking speed upon completion of the direct manipulation of the object.

* * * * *